May 21, 1946. J. J. BLOOMFIELD 2,400,625
CLUTCH
Original Filed July 7, 1941
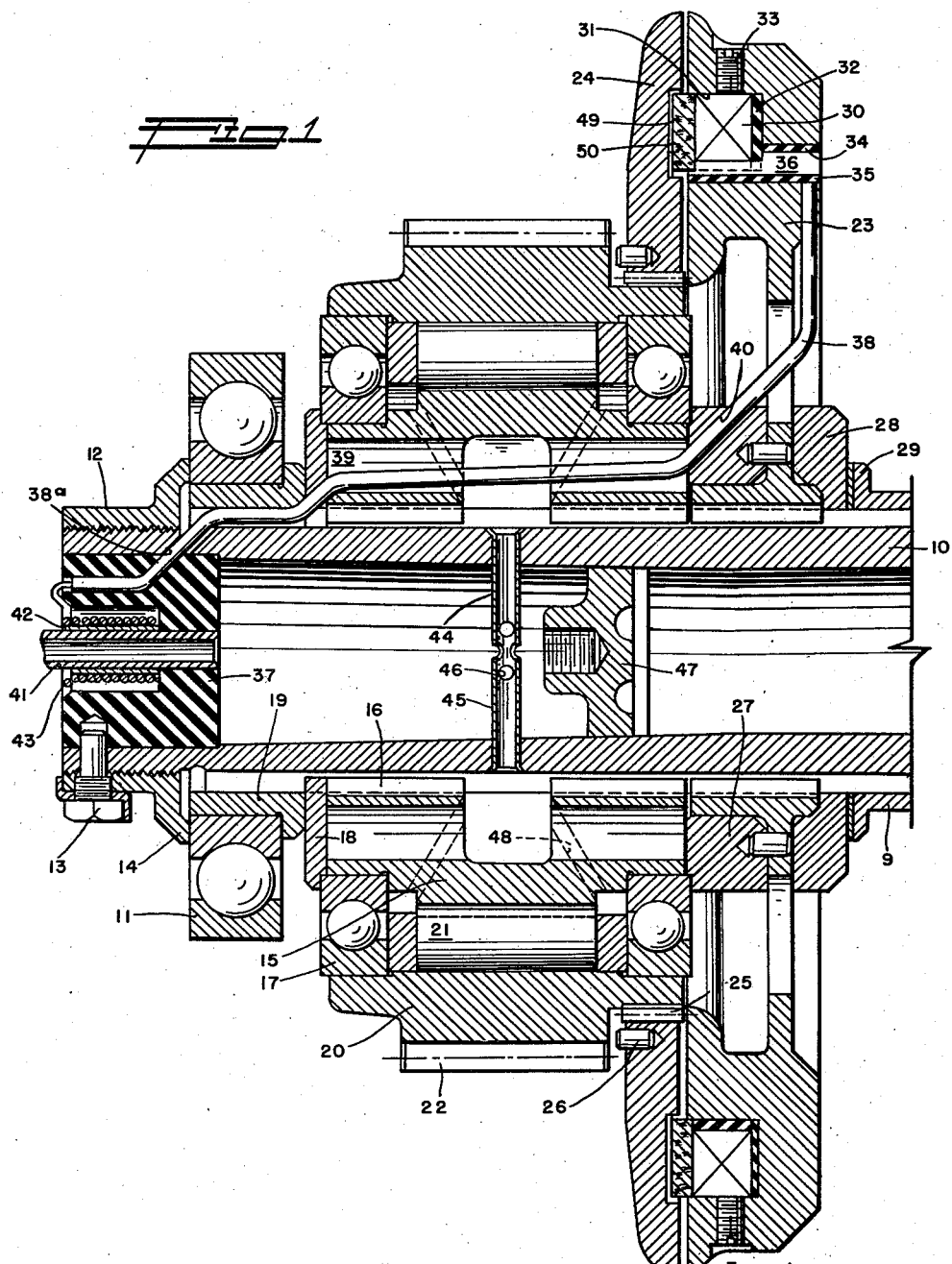
Inventor
John J. Bloomfield
By George C. Sullivan
Agent Patented May 21, 1946

2,400,625

UNITED STATES PATENT OFFICE 2,400,625

CLUTCH

John J. Bloomfield, Burbank, Calif., assignor, by mesne assignments, to Lockheed Aircraft Corporation, a corporation of California Original application July 7, 1941, Serial No. 401,328. Divided and this application September 13, 1943, Serial No. 502,088

3 Claims. (Cl. 192—48)

This invention relates to clutches for the transmission of power, and relates more particularly to one-way or overrunning clutch mechanisms embodying means for locking up the one-way drive device. A general object of this invention is to provide a practical, dependable and highly effective clutch mechanism of this character.

This application is a division of application Serial Number 401,328, filed July 7, 1941, entitled, "Magnetic clutch."

For illustrative purposes, I have herein disclosed the invention embodied in a clutch mechanism for transmitting power from one or more airplane engines to a propeller; the mechanism being designed to allow "windmilling" of the propeller and to allow one engine of several engines driving one propeller to drop out of the drive. In such a structure it is desirable to lock up the one-way clutch to transmit torque from the driven element, or propeller, to the engine or engines. It is to be understood that the invention is capable of embodiment in mechanisms suitable for other installations and the reference herein to its embodiment in aircraft is not to be construed as limiting either the scope or application of the invention.

Another object of the invention is to provide a clutch mechanism of the character referred to embodying a mechanical one-way or overrunning clutch for the normal transmission of power from the driver to the driven element, and a magnetically actuated clutch for locking up the mechanism for the transmission of power from the normally driven element to the driver or engine.

Another object of the invention is to provide a clutch mechanism of the character referred to in which the magnetic clutch or lock-up means is capable of operating under heavy loads and speed differentials. The magnetically operated clutch means provides for the direct frictional contact of the clutch elements for the transmission of torque and is operable to maintain these elements in firm engagement for the transmission of heavy torque. The magnetic clutch means embodied in the mechanism does not depend upon the resistance to disturbance offered by a magnetic field or flux for the transmission of the power, but provides for the transmission of the power through directly engaged mechanical elements.

A further object of the invention is to provide a clutch mechanism of the character referred to which is compact and relatively light in weight, the elements being related so that one clutch part of the magnetic clutch means is carried by the driven part of the mechanical clutch.

Other objects and features of the invention will be readily understood from the following detailed description of a typical illustrative embodiment, throughout which description reference will be made to the accompanying drawing which is a central longitudinal detailed sectional view of the mechanism.

In the drawing, 10 designates the driving element which may be considered the crank shaft of an engine. A suitable anti-friction bearing 11 serves to support the outboard end of the shaft. A nut 12 is threaded on the outboard end of the shaft and is locked thereon by a screw 13. A flange 14 on the nut 12 bears against the inner race of the bearing 11.

The overrunning clutch includes a hub 15 connected with the drive shaft 10 by splines 16. The opposite ends of the hub 15 are recessed to receive ball bearings 17. The outermost bearing 17 is retained in its groove by a plate 18. The bushing or collar 19 which carries the bearing 11 engages the plate 18 so that the plate is held against the ends of the hub 15 and the outermost bearing 17. The overrunning clutch further includes an outer member or shell 20 surrounding the hub 15 and rotatably supported thereon by the bearings 17. Rollers 21 are arranged between the hub 15 and the shell 20 to complete the overrunning clutch assembly. The rollers 21 wedge between the hub and the shell to transmit torque upon rotation of the shaft 10 in one direction, this operation being typical of roller type overrunning clutches. Upon rotation of the shaft 10 in the other direction, the rollers 21 are free to permit "free wheeling" or overrunning of the shell 20. In the particular application of the invention illustrated, the driven element of the mechanism is a pinion 22 formed on the periphery of the shell.

The magnetic clutch means includes a disc 23 splined on the shaft 10 at or beyond the inner end of the hub 15 and an opposing disc 24 shiftably connected with the shell 20 by splines 25. Stop pins 26 on the disc 24 are engageable with the end face of the shell 20 to limit the releasing movement of the disc. The clutch discs 23 and 24 have extensive annular surfaces opposing one another and lying in planes normal to the longitudinal axis of the shaft 10. A friction ring 27 is secured to the hub portion of the disc 23 and engages between the disc and the inner end of the hub 15. The ring 27 may be pinned to the disc 23 and serves to dampen out slight movement between the disc and the hub 15. A somewhat similar ring 28 is engaged between the other side of the disc 23 and a flange 29 on the shaft housing 9 to serve as a torsional vibration damper. It will be observed that the disc 24 is carried directly by the shell 20 and that the disc 23 is carried directly by the shaft 10 so that frictional cooperation between the discs operates to cut out or by-pass the one-way clutch rollers 21.

The magnetic clutch means further includes an electro-magnetic winding 30 on one of the discs 23 or 24 for producing relative axial movement between them and thus bring the discs into frictional cooperation for the transmission of torque. In accordance with the broader aspects of the invention an electro-magnetic coil may be provided on either one or both of the discs. In the construction illustrated, the disc 23 has a substantial thickness to provide a flywheel effect for the drive shaft 10 and the relatively thick disc is provided with a groove 31 in its inner surface for receiving a winding 30. The thick walled disc 23 provides an adequate flux path for the coil. The groove 31 is open at the active face of the disc so that the flux path may be a closed circuit completed through the disc to obtain the maximum flux pressure.

In accordance with the broader aspects of the invention any selected form of electro-magnetic winding may be employed. It is preferred, however, to employ the type of winding described and claimed in my copending application referred to above. This preferred winding is in the nature of a preformed ring constructed of a thin aluminum strip wound under tension. Prior to the winding or wrapping, the aluminum strip is subjected to an anodic treatment to be self insulated. The outer end of the coil is lacquered and a ring 32 of dielectric material spaces the inner end of the coil from the bottom wall of the groove 31. The outer layer or convolution of the winding has its insulating anodic coating removed to make electrical grounding contact with the outer wall of the groove 31. One or more set screws 33 are threaded through radial openings in the periphery of the disc 23 to cooperate with the outer convolution of the coil to secure the coil in the groove and to assure an effective grounding of the coil.

An axial opening 34 extends through the disc 23 to communicate with the groove 31. A tubular insulator 35 lines the opening 34. A plug 36 is arranged in the insulator 35 and is cut away at its inner end to partially receive the inner portion of the coil 30. The inner convolution of the coil 30 is electrically secured to the plug 36.

A plug 37 of dielectric material is arranged in the outboard end of the tubular shaft 10 and may be secured or locked therein by the screw 13. A lead-in wire 38 extends through an opening in the plug 37, then passes through an opening 38ª in the tubllar shaft 10 to continue through the collar 19 and plate 18 to a lightening opening 39 in the hub 15. The wire 38 continues through an opening 40 in the ring 27 and passes outwardly to the plug 36 with which it is electrically connected.

Suitable terminal means is provided for the outer end of the wire 38. I have shown a central tubular terminal 41 engaged in the plug 37 and carrying a sleeve 42. A coiled spring 43 surrounds the sleeve 42 and is electrically connected with the outer end of the wire 38. The terminal 41 may serve as oil supply tube for delivering oil to the interior of the tubular shaft 10. The shaft 10 has a diametric opening 44 carrying the ends of a cross tube 45. The outer ends of the cross tube 44 are open to the interior of the ported hub 15. Spaced radial openings 46 are provided in the cross tube 44 to communicate with the interior of the tubular shaft 10. A plug 47 spaced inwardly from the cross tube 45 closes the shaft 10 against the inward flow of lubricant. Oil or other lubricant supplied to the terminal 41 passes through the outboard portion of the shaft 10 to enter the cross tube 45. The oil continues outwardly through the cross tube 45 to the interior of the hub 15 to lubricate the hub, the rollers 21 and the bearings 17. Lubricant openings 48 may be provided in the hub 15 to conduct the oil from the lightening openings 39 to the bearings 17.

The magnetic clutch means further includes a layer or ring 49 of compressible resilient material for providing an initial frictional cooperation between the discs 23 and 24 upon energization of the electro-magnetic coil 30 and for overcoming the residual magnetic flux upon de-energization of the winding. I prefer to construct the ring 49 of cork or pressed ground cork to be effective as a friction element and to have sufficient resiliency to overcome the residual magnetic flux which might otherwise cause the clutch to drag after de-energization of the coil 30. I prefer to position the ring 49 in the mouth of the groove 31 to project from the face of the disc 23. As illustrated, the coil 30 is inset from the active face of the disc 23 so that the groove 31 may partially house or receive the ring 49. An annular groove 50 is provided in the active face of the disc 24 to oppose the groove 31 and to partially receive the resilient ring 49. The ring 49 is proportioned to be compressed to some extent when the coil 30 is energized and this compression of the ring allows the active faces of the discs 23 and 24 to come into direct engagement. It is to be observed that the force utilized to compress the ring 40 is not lost, as it is in the case of springs frequently used in clutches, but is usefully employed to maintain the ring in the torque transmitting condition between the discs 23 and 24. The opposing grooves 31 and 50 divide the active faces of the discs 23 and 24 into spaced annular surfaces. This aids in defining a substantially toroidal path for the magnetic flux.

In the operation of the mechanism when the shaft 10 is rotating in what may be considered the forward direction, the rollers 21 bind or engage between the hub 15 and the shell 20 to transmit the power or torque to the driven element or pinion 22. When the shaft 10 is idle and the driven element is rotating, for example, because of windmilling of the propeller, the rollers 21 assume inactive positions and the driven element is free to rotate with respect to the shaft. In a like manner, when the shaft 10 is rotated in a reverse direction, the rollers 21 assume inactive positions and no torque is transmitted to the driven element. If it is desired to lock up the clutch mechanism in either of the two last named situations the electro-magnetic coil 30 is energized. Upon energization of the coil 30 the disc 24 moves toward the disc 23 to first compress the ring 49 and secondly to come into direct contact with the face of the disc 23. Thus the discs 23 and 24 are brought into direct engagement for the transmission of torque between the shaft 10 and the driven element 22, this drive being effective in either direction of rotation. The magnetic clutch means may be energized to provide for the effective reverse transmission of torque through the mechanism or to provide for the transmission of torque from the driven element to the driving element or shaft 10. When the coil 30 is de-energized the resilient ring 49 operates to move the disc 24 away from the disc 23 to disengage the magnetic clutch. This action of the ring 49 overcomes the tendency of the residual magnetic flux to cause the clutch to drag after the coil 30 has been de-energized.

Having described only a typical form of the invention, I do not wish to be limited to the specific details herein set forth, but wish to reserve to myself any variations or modifications that may appear to those skilled in the art or fall within the scope of the following claims.

I claim:

1. A clutch mechanism comprising a first element operable to normally drive in one direction, a second element intended to be normally driven in said direction, an overrunning clutch means operable to transmit torque in said direction from the first element to the second element and adapted to allow rotation of the second element relative to the first element in said direction, and clutch means for transmitting torque in said direction from the second element to the first element including a clutch member rotatable with each element, one member being movable into and out of engagement with the other member, and an electro-magnet coil on a member for moving the movable member into torque transmitting contact with said other member, and resilient friction material compressed between said members upon said movement of the movable member and expansible to free the members one from the other upon the de-energization of the coil.

2. In a mechanism of the character described, a drive shaft, a hub on the shaft rotatable therewith, a driven element surrounding the hub, overrunning clutch means between the hub and element operable to transmit torque from the hub to the element upon rotation of the shaft in one direction only, a clutch member fixed to the shaft, a second clutch member rotatable with the element and shiftable into torque-transmitting engagement with the first named member, and electro-magnetic means on one of the members for moving the second member into engagement with said first named member when it is desired to transmit torque from said element to the shaft in said direction of rotation.

3. In a mechanism of the character described, a drive shaft, a hub on the shaft rotatable therewith, a driven element surrounding the hub, overrunning clutch means between the hub and element operable to transmit torque from the hub to the element upon rotation of the shaft in one direction only, a clutch member fixed to the shaft, a second clutch member rotatable with the element and shiftable into torque-transmitting engagement with the first named member, and an electro-magnetic coil means on the first named member for so shifting said second member when it is desired to transmit rotation between the element and hub in said direction.

JOHN J. BLOOMFIELD.